Nov. 17, 1942.    H. A. KNOX    2,301,954
TRACK SHOE
Filed May 26, 1941    2 Sheets-Sheet 1
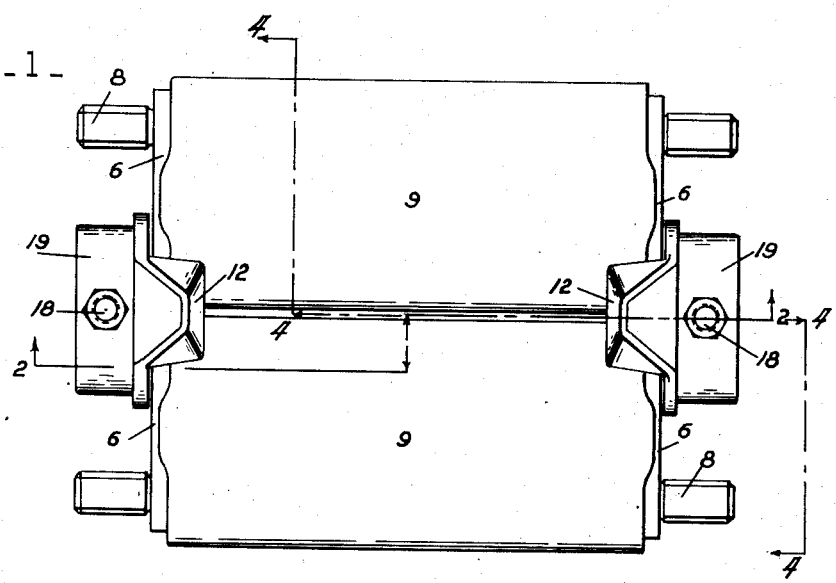
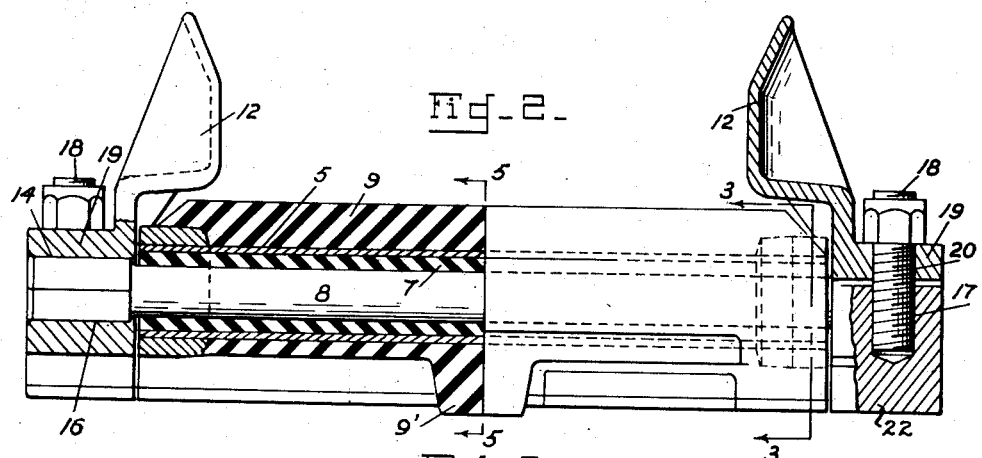
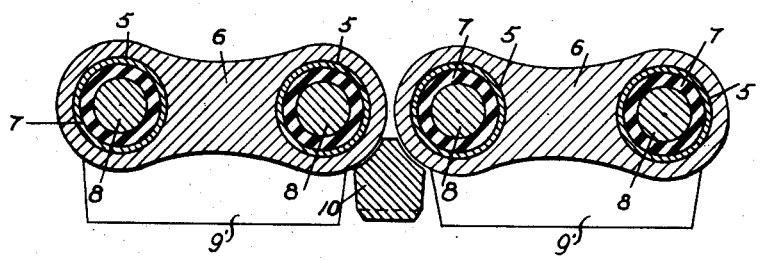
INVENTOR
Harry A. Knox
BY
ATTORNEYS Nov. 17, 1942. H. A. KNOX 2,301,954
TRACK SHOE
Filed May 26, 1941 2 Sheets-Sheet 2
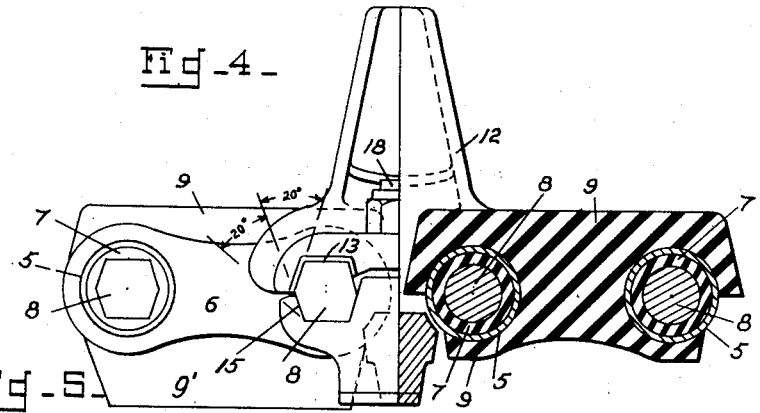
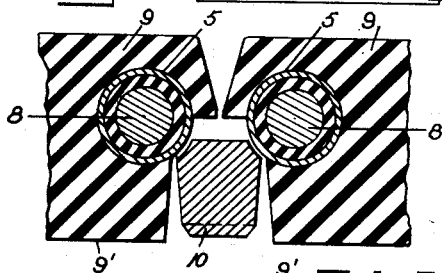
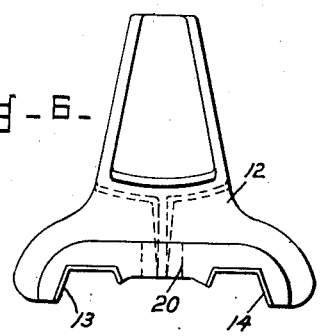
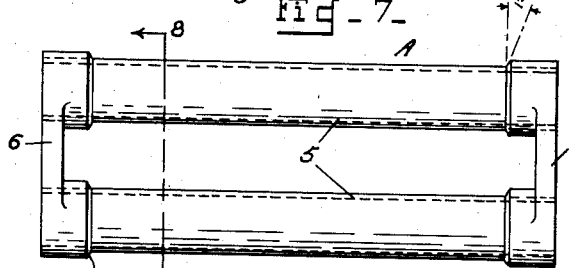
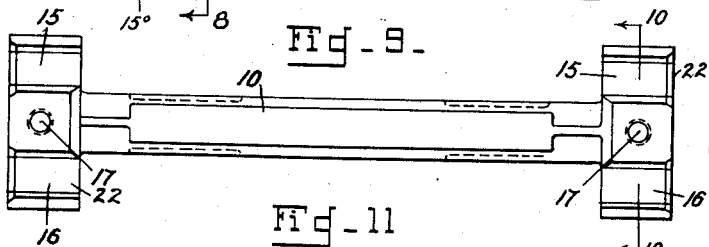
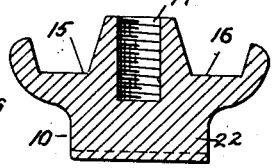
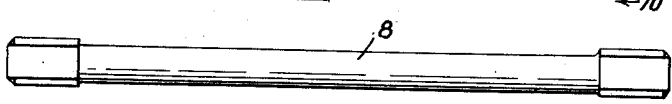
INVENTOR
Harry A. Knox
BY
ATTORNEYS Patented Nov. 17, 1942

2,301,954

UNITED STATES PATENT OFFICE 2,301,954

TRACK SHOE

Harry A. Knox, Washington, D. C.

Application May 26, 1941, Serial No. 395,231

13 Claims. (Cl. 305—10)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to an improved track for a track-laying machine.

An object of my present invention is to provide a track having lugs or "grousers" for use in muddy, sandy or rocky terrain arranged so that the track might also be used on paved roads without noise or destruction to the road.

Another object of my invention is to provide an all purpose track without rescrting to a mechanical process, as was done in the prior art, wherein it was necessary for the operating personnel to mount lugs or "grousers" on the track in order that good traction be obtained in difficult terrain.

Another object of my invention is to provide a novel arrangement of the link and lug or "grouser" elements in a track construction.

Another object of my invention is to provide a novel arrangement of resilient cushioning means and lug or "grouser" elements in a track construction.

Another object of my invention is to provide a track shoe having resilient ground engaging lugs whose ground engaging surface area is substantially less than the projected area of the track shoe and which are disposed on the track shoe so as not to impair the effectiveness of ground engaging cleats or grousers on the track shoe.

To these and other ends, the invention consists in the construction, arrangement and combination of elements described hereinafter and pointed out in the claims forming a part of this specification.

Fig. 1 is an inside plan view of a portion of the improved track.

Fig. 2 is a view in side elevation and with parts in section on the line 2—2 of Fig. 1.

Fig. 3 is a view taken along the line 3—3 indicated in Fig. 2.

Fig. 4 is an end view of the assembly shown in Fig. 1 and a section taken substantially on line 4—4—4—4.

Fig. 5 is a view taken along the line 5—5 of Fig. 2.

Fig. 6 is an end view of the upper portion of the link.

Fig. 7 is a plan view of the shoe frame.

Fig. 8 is a view taken along the line 8—8 of Fig. 7.

Fig. 9 is a plan view of the lug, cleat, or "grouser."

Fig. 10 is a view taken along the line 10—10 of Fig. 9.

Fig. 11 is a plan view of the link pin.

Referring to the drawings, each individual shoe on the track is formed around the frame member A, Fig. 7. The steel alloy tubes 5 of the frame A are held in spaced relationship by the end members 6 which are affixed to the tubes in any convenient manner as by welding or brazing. The inner ends of the members 6 are formed with perpendicular shoulders as shown in Fig. 3 or with 15° portions as indicated in Fig. 7. A rubber bushing 7 inserted within the confines of each tube serves to allow rotational movement between the inserted link pin 8 and the tube 5 and also serves as a resilient connection between those two members.

Rubber or other resilient material 9 is attached to the frame A by vulcanization or other similar process and disposed on the frame as indicated on the drawings. The resilient material disposed on the top of the frame serves as a cushion for the outer rim of the tank wheel (not shown). A relatively small amount of the resilient material extends below the bottom edge of the tubes as shown in Fig. 4 but the rubber portion or lug 9' located in the center of the shoe projects downward beyond any metallic member on the track by approximately $\frac{1}{8}$" to $\frac{1}{16}$". The rubber projection or lug 9' extends the entire lateral distance between tubes 5 in the preferred embodiment of this invention, but the projections 9' may take a variety of forms and shapes and may extend only a fraction of the distance between tubes and yet be included within the spirit of this invention.

The ends of the pins have six faces and are not a true hexagon as indicated in Figs. 4 and 11. The upper link portions 12 have recesses 13 and 14 adapted to have inserted therein the upper faces on the ends of the pins 8. The "grouser" or cleat 10 has projections 22 with recesses 15 and 16 adapted to have inserted therein the lower faces of the ends of the pins 8 and has a tapped hole 17 for the reception of a stud bolt 18. An aperture 20 in the flanged portion 19 of the upper link portion 12 permits passage of the bolt 18. It is obvious that the "grouser" or cleat 10 besides performing the functions of such a device also serves to cooperate with the upper link portion 12 to serve as a clamping member and a link member for the adjoining pins of adjoining shoes.

I claim:

1. In a track for a track-laying vehicle, a series of spaced shoes having bearings, link pins inserted through the bearings and each having a non-circular portion adjacent each of its ends, a link member on the ends of adjoining pins of adjoining shoes, a flange on each link member and projecting laterally relative to the track, a recess in the ground side surface of said flange adapted to have inserted therein a section of said non-circular portion, a ground engaging cleat for said track disposed between adjoining pins of adjoining shoes and extending substantially the width of the shoe, a projection on said cleats, a recess in said projection adapted to have inserted therein a second section of said non-circular pin portion and means to clamp said flange and said projection together to prevent relative independent rotation of adjoining pins.

2. In a track for a track-laying vehicle, a series of spaced shoes having bearings, link pins inserted through the bearings and each having a non-circular portion adjacent each of its ends, a link member on the ends of adjoining pins of adjoining shoes and adapted to engage non-circular portions of adjoining pins, a ground engaging cleat disposed at the junction of two adjoining shoes and extending substantially the width of the shoe, and means for clamping adjoining pins against relative independent rotation comprising in part said link member and a projection on said cleat.

3. In a shoe for a track-laying vehicle comprising a pair of bearings, means for holding said bearings in spaced parallel relationship, resilient material partially encasing said bearings in spaced relationship and forming an upper smooth surface adapted to abut the wheel of said vehicle, a resilient lug extending downward from the body of said resilient material and having a ground engaging surface area substantially less than the area included between said bearings, a metal cleat, and means for mounting the metal cleat on the shoe.

4. In a shoe for a track-laying vehicle comprising a pair of bearings, rigid end pieces disposed between the ends of said bearings for holding said bearings in parallel spaced relationship, resilient material partially encasing said composite bearing structure and forming an upper smooth surface adapted to abut the wheel of said vehicle, a resilient lug extending downward from the body of said resilient material and having a ground engaging surface area substantially less than the area included between said bearings, a metal cleat, and means for mounting the metal cleat on the shoe.

5. In a shoe for a track-laying vehicle comprising a pair of bearings, means for holding said bearings in parallel spaced relationship, resilient material disposed within the intermediate space between said bearings, a resilient projection extending downward from the body of said resilient material and having a ground engaging surface area substantially less than the area included between said bearings, a metal cleat, and means for mounting the metal cleat on the shoe.

6. In a track for a track-laying vehicle, a series of spaced shoes having bearings, link pins inserted through the bearings and each having a non-circular portion adjacent each of its ends, a resilient lug mounted on each shoe and having a ground engaging surface area substantially less than the area included between bearings on the same shoe, a link member on the ends of adjoining pins of adjoining shoes, a flange on each link projecting laterally relative to the track, a recess in the ground side surface of said flange adapted to have inserted therein a section of said non-circular portion, a ground engaging cleat for said track disposed between adjoining pins of adjoining shoes, a projection on said cleat, a recess in said projection adapted to have inserted therein a second section of said non-circular portion, and means to clamp said flange and said projection together to prevent relative independent rotation of adjoining pins.

7. In a track for a track-laying vehicle, a series of spaced shoes having bearings, link pins inserted through the bearings and each having a non-circular portion adjacent each of its ends, a resilient lug on each shoe and having a ground engaging surface area substantially less than the area included between bearings on the same shoe, a link member on the ends of adjoining pins of adjoining shoes and adapted to engage non-circular portions of adjoining pins, a ground engaging cleat disposed at the junction of two adjoining shoes and extending substantially the width of the shoe, and means for clamping adjoining pins against independent relative rotation comprising in part said link member and a projection on said cleat.

8. A track for a track-laying vehicle having a series of resilient lugs and a series of metal lugs adapted to engage the ground, said resilient lugs extending a small distance beyond the outer edge of said metal lugs and within the resilient limits of the resilient lugs.

9. A track for a track-laying vehicle having a series of resilient lugs and a series of metal lugs adapted to engage the ground, said resilient lugs extending approximately $\frac{3}{32}''$ beyond the outer surface of said lugs for the purposes described above.

10. In a track for a track laying vehicle, a series of spaced shoes having bearings, link pins inserted through the bearings and projecting therefrom, a resilient lug on each shoe and having a ground engaging surface area substantially less than the area included between bearings on the same shoe, a link member on the ends of adjoining pins of adjoining shoes and adapted to engage the projecting pins, a ground engaging cleat disposed at the junction of adjoining shoes, and means for clamping adjoining pins against independent relative rotation comprising in part said link member and a projection on said cleat, said resilient lug extending a small distance beyond the outer edge of said cleat and within the resilient limits of the resilient lug.

11. In a track for a track laying vehicle, a track shoe having a pair of bearings, means for holding said bearings in parallel spaced relationship, a resilient lug extending substantially the entire distance between the bearings and having a ground engaging area substantially less than the area included between the spaced bearings, pins passing through the bearings and projecting therefrom, the resilient lug being integral with the track shoe, a ground engaging cleat for said track disposed between adjoining pins of adjoining shoes, a link member on the ends of adjoining pins of adjoining shoes, and means for clamping adjoining pins against independent relative movement comprising in part said link and a projection on said cleat.

12. In a track for a track laying vehicle, a series of spaced shoes having bearings, link pins inserted through the bearings and projecting therefrom, a link member on the projecting ends of adjoining pins of adjoining shoes, a ground engaging cleat disposed at the junction of two adjoining shoes, and means for clamping adjoining pins against relative independent rotation comprising in part said link member and a projection on said cleat.

13. A track shoe having at least one resilient lug adapted to engage the ground and at least one metal cleat adapted to engage the ground, said resilient lug extending a small distance beyond the outer edge of said metal cleat and within the resilient limits of the resilient lug.

HARRY A. KNOX.